US010789006B1

(12) United States Patent
Gokam et al.

(10) Patent No.: US 10,789,006 B1
(45) Date of Patent: Sep. 29, 2020

(54) PATH-BASED DATA MIGRATION FROM SOURCE DEVICE TO TARGET DEVICE

(71) Applicant: EMC IP Holding Company LLC, Hopkinton, MA (US)

(72) Inventors: Kurumurthy Gokam, Bangalore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 16/410,706

(22) Filed: May 13, 2019

(51) Int. Cl.
G06F 3/06 (2006.01)

(52) U.S. Cl.
CPC ............ *G06F 3/0647* (2013.01); *G06F 3/061* (2013.01); *G06F 3/067* (2013.01); *G06F 3/0635* (2013.01); *G06F 3/0665* (2013.01)

(58) Field of Classification Search
CPC ...... G06F 3/067; G06F 3/0635; G06F 3/0647; G06F 3/0617; G06F 3/0689; G06F 3/0665; G06F 3/061; G06F 11/201; G06F 3/065; G06F 2009/45579; G06F 11/2089; H04L 45/24
See application file for complete search history.

(56) References Cited

U.S. PATENT DOCUMENTS

| | | |
|---|---|---|
| 6,687,746 B1 | 2/2004 | Shuster et al. |
| 6,697,875 B1 | 2/2004 | Wilson |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,255,596 B2 * | 8/2012 | Kull ..................... G06F 3/0617 710/38 |
| 9,400,611 B1 | 7/2016 | Raizen |
| 9,594,780 B1 | 3/2017 | Esposito et al. |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Reginald G Bragdon
*Assistant Examiner* — Thanh D Vo
(74) *Attorney, Agent, or Firm* — Ryan, Mason & Lewis, LLP

(57) ABSTRACT

A host device comprises a current multi-path input-output (MPIO) driver that is configured to group paths from the host device to a source logical volume into a source multi-path logical device. A source multi-path logical device for a target MPIO driver is generated that has the same group of paths as the source multi-path logical device of the current MPIO driver. The source multi-path logical device of the target MPIO driver is added as a path in the source multi-path logical device of the current MPIO driver and the other paths are removed. A target multi-path logical device for the target MPIO driver is generated that groups paths from the host device to a target logical volume into the target multi-path logical device. Data from the source logical volume to the target logical volume is migrated based at least in part on the source and target multi-path logical devices of the target MPIO driver.

20 Claims, 15 Drawing Sheets

(56) References Cited

U.S. PATENT DOCUMENTS

| | | |
|---|---|---|
| 9,778,852 B1 | 10/2017 | Marshak et al. |
| 2004/0010563 A1 | 1/2004 | Forte et al. |
| 2007/0174849 A1 | 7/2007 | Cheung et al. |
| 2008/0043973 A1 | 2/2008 | Lai et al. |
| 2010/0313063 A1 | 12/2010 | Venkataraja et al. |
| 2011/0197027 A1 | 8/2011 | Balasubramanian et al. |
| 2014/0105068 A1 | 4/2014 | Xu |
| 2016/0117113 A1 | 4/2016 | Li et al. |

OTHER PUBLICATIONS

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. on Dec. 21, 2017 and entitled "Storage System with Input-Output Performance Control Utilizing Application Process Detection."

U.S. Appl. No. 15/795,653 filed in the name of Maneesh Pusalkar et al. on Oct. 27, 2017 and entitled "Storage System with Network-Wide Configurable Device Names."

U.S. Appl. No. 16/261,856 filed in the name of Sanjib Mallick et al. on Jan. 30, 2019 and entitled "Path-Based Migration of Control of a Multi-Path Logical Device from a Current MPIO Driver to a Target MPIO Drive."

\* cited by examiner

204 — MPATH-SOURCE (00000000000000000000000000000001) dm-3
size=5.0G features='1 queue_if_no_path' hwhandler='0' wp=rw
`-+- policy='service-time 0' prio=1 status=active
212-1  |- 13:0:0:1   sdd    8:48     active ready running
212-2  |- 13:0:1:1   sdl    8:176    active ready running
212-3  |- 15:0:0:1   sdv    65:80    active ready running
          . . .               . . .
212-P  |- 15:0:1:1   sdm    8:192    active ready running

FIG. 3

218 — MPATH_TARGET (00000000000000000000000000000002) dm-6
size=5.0G features='0' hwhandler='0' wp=rw
`-+- policy='service-time 0' prio=0 status=active
224-1  |- #:#:#:#   sde    8:64     active undef running
224-2  |- #:#:#:#   sdn    8:208    active undef running
224-3  |- #:#:#:#   sdw    65:96    active undef running
          . . .               . . .
224-Q  `- #:#:#:#   sdaf   65:240   active undef running

FIG. 4

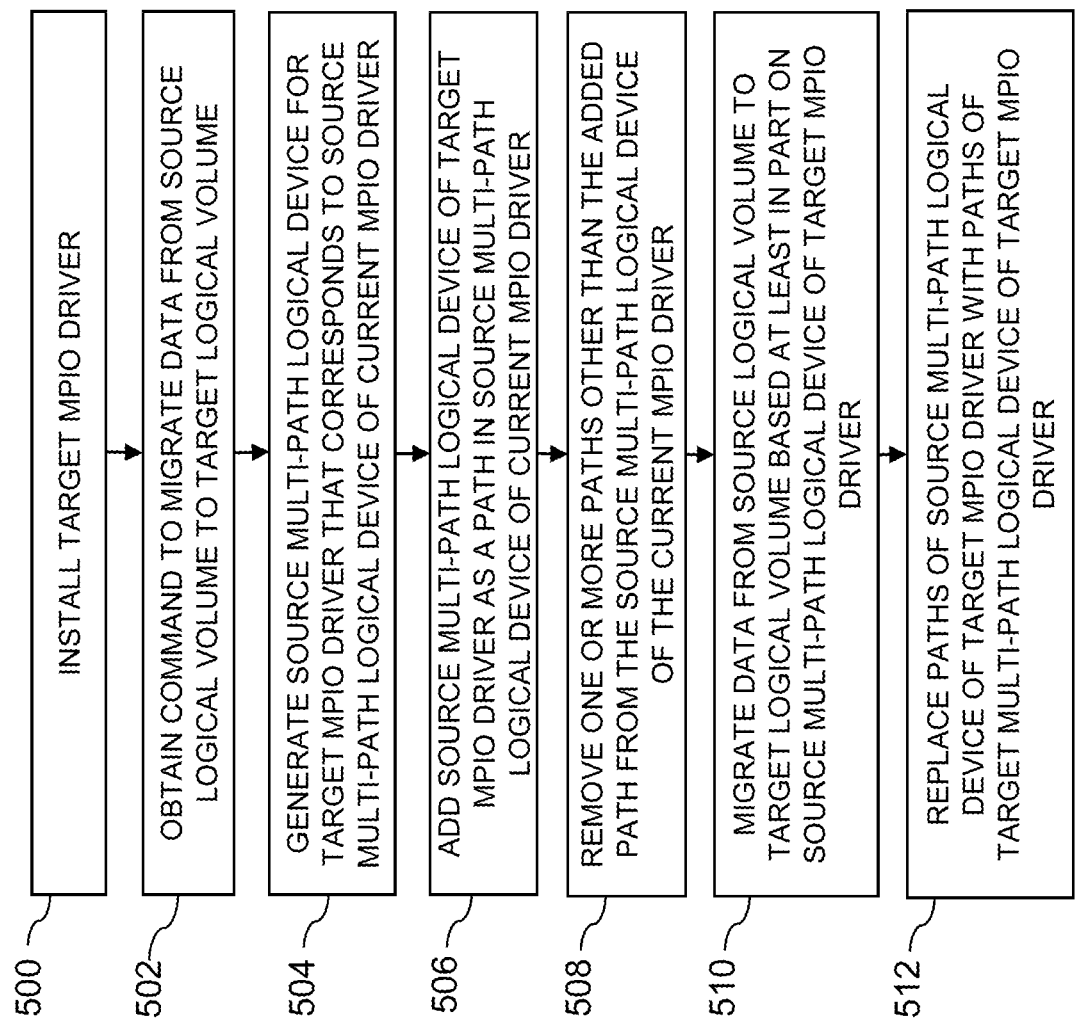

604 —
```
[root@abc0000001 ~]# powermt display dev=source
Pseudo name= source multi-path logical device of target MPIO driver
Array ID=0000000001
Logical device ID=0000240F
Device WWN=60000000000000000000000000000001
state=alive; policy=SymmOpt; queued-IOs=0
=================================================================================
------ Host ------   - Stor -   ---- I/O Path ----   -- Stats ---
HW Path  I/O Paths   Interf.      Mode     State    Q-IOs  Errors
=================================================================================
 13    lpfc     sdd        FA 1d:05    active    alive      0      0
 13    lpfc     sdl        FA 1d:04    active    alive      0      0
 15    lpfc     sdv        FA 1d:05    active    alive      0      0
 ...   ...      ...        ...         ...       ...       ...    ...
 15    lpfc     sdm        FA 1d:04    active    alive      0      0
```

FIG. 6

204 —
```
MPATH-SOURCE (00000000000000000000000000000001) dm-3
size=5.0G features='1 queue_if_no_path' hwhandler='0' wp=rw
`-+- policy='service-time 0' prio=1 status=active
  |- 13:0:0:1   sdd      8:48      active ready running
  |- 13:0:1:1   sdl      8:176     active ready running
  |- 15:0:0:1   sdv      65:80     active ready running
  ...           ...      ...       ...
  |- 15:0:1:1   sdm      8:192     active ready running
  `- #:#:#:#    source   120:112   active ready running  << source multipath device of target MPIO driver
```

FIG. 7

```
904 ─┐ [root@abc0000001 ~]# powermt display dev=target
     │ Pseudo name= target multi-path logical device of target MPIO driver
     │ Array ID=00000000001
     │ Logical device ID=0000240F
     │ Device WWN=60000000000000000000000000000002
     │ state=alive; policy=SymmOpt; queued-IOs=0
     │ ========================================================================
     │ ------- Host -------    - Stor -      --- I/O Path ---    --- Stats ---
     │ ###   HW Path  I/O Paths    Interf.      Mode     State       Q-IOs  Errors
     │ ========================================================================
224-1─┤ 13    lpfc     sde         FA 1d:05    active   alive         0      0
224-2─┤ 13    lpfc     sdn         FA 1d:04    active   alive         0      0
224-3─┤ 15    lpfc     sdw         FA 1d:05    active   alive         0      0
       │ ...                        ...         ...      ...          ...    ...
224-Q ─┤ 15    lpfc     sdaf        FA 1d:04    active   alive         0      0
```

FIG. 9

```
218 ─┐ MPATH_TARGET (00000000000000000000000000000002) dm-3
     │ size=5.0G features='1 queue_if_no_path' hwhandler='0' wp=rw
     │ `-+- policy='service-time 0' prio=1 status=active
224-1─┤ |- #:#:#:#    sde     8:64      active undef running
224-2─┤ |- #:#:#:#    sdn     8:208     active undef running
224-3─┤ |- #:#:#:#    sdw    65:96      active undef running
       │  ...          ...     ...       ...
224-Q ─┤ `- #:#:#:#   sdaf   65:240     active undef running
224-Q+1┤ `- #:#:#:#   target 120:96     active ready running  << target multipath device of target MPIO driver
```

FIG. 10

204 — MPATH-SOURCE (00000000000000000000000000000001) dm-3
size=5.0G features='1 queue_if_no_path' hwhandler='0' wp=rw
`-+- policy='service-time 0' prio=1 status=active
212-P+1 — `- #:#:#.#    target    120:112    active ready running << source multipath device of target MPIO driver

FIG. 12

218 — MPATH_TARGET (00000000000000000000000000000002) dm-3
size=5.0G features='1 queue_if_no_path' hwhandler='0' wp=rw
`-+- policy='service-time 0' prio=1 status=active
224-Q+1 — `- #:#:#.#    target    120:112    active ready running << target multipath device of target MPIO driver

FIG. 13

| Hnd | Source | Target | Tech | State |
|---|---|---|---|---|
| 1 | source | target | HostCopy | syncing(29%) |

```
[root@abc0000001 ~]# powermt display dev=source
Pseudo name= source multi-path logical device of target MPIO driver
Array ID=00000000001
Logical device ID=0000240F
Device WWN=60000000000000000000000000000001
state=alive; policy=SymmOpt; queued-IOs=0
```

| | ------ Host ------ | | - Stor - | ------ I/O Path ------ | | ------ Stats ------ | |
|---|---|---|---|---|---|---|---|
| ### | HW Path | I/O Paths | Interf. | Mode | State | Q-IOs | Errors |
| 13 | lpfc | sde | FA 1d:05 | active | alive | 0 | 0 |
| 13 | lpfc | sdn | FA 1d:04 | active | alive | 0 | 0 |
| 15 | lpfc | sdw | FA 1d:05 | active | alive | 0 | 0 |
| ... | ... | ... | ... | ... | ... | ... | ... |
| 15 | lpfc | sdaf | FA 1d:04 | active | alive | 0 | 0 |

FIG. 17

```
[root@abc0000001 ~]# powermt display dev=target
Pseudo name= target multi-path logical device of target MPIO driver
Array ID=00000000001
Logical device ID=0000240F
Device WWN=60000000000000000000000000000002
state=alive; policy=SymmOpt; queued-IOs=0
```

| ### | ------Host------ HW Path | I/O Paths | - Stor - Interf. | ------I/O Path------ Mode | State | ------Stats------ Q-IOs | Errors |
|---|---|---|---|---|---|---|---|
| 13 | lpfc | sdd | FA 1d:05 | active | alive | 0 | 0 |
| 13 | lpfc | sdl | FA 1d:04 | active | alive | 0 | 0 |
| 15 | lpfc | sdv | FA 1d:05 | active | alive | 0 | 0 |
| ... | ... | ... | ... | ... | ... | ... | ... |
| 15 | lpfc | sdm | FA 1d:04 | active | alive | 0 | 0 |

PATH-BASED DATA MIGRATION FROM SOURCE DEVICE TO TARGET DEVICE

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the host device to the storage system. In some cases, a user of the host device may wish to migrate data from a source logical volume under control of a current MPIO driver to a target logical volume under control of that current MPIO driver or another MPIO driver. However, such data migration typically requires significant and substantial application downtime, such as, e.g., outages, reconfiguration, or other similar downtime, as the data migration is performed, especially in cases where the data is being migrated between logical volumes under control of different MPIO drivers.

SUMMARY

Illustrative embodiments disclose techniques for path-based data migration from a source logical volume under control of a source multi-path logical device to a target logical volume under control of a target multi-path logical device.

In one embodiment, an apparatus comprises a host device configured to communicate over a network with a storage system. The host device comprises a current MPIO driver configured to control delivery of IO operations to the storage system over the network. The current MPIO driver is further configured to group a plurality of paths from the host device to a source logical volume of the storage system into a source multi-path logical device of the current MPIO driver. The host device is further configured to generate a source multi-path logical device for a target MPIO driver. The source multi-path logical device of the target MPIO driver comprises the same grouping of the plurality of paths from the host device to the source logical volume as the source multi-path logical device of the current MPIO driver. The host device is further configured to add the source multi-path logical device of the target MPIO driver as a path in the source multi-path logical device of the current MPIO driver and to remove one or more paths of the source multi-path logical device of the current MPIO driver other than the added path. The host device is further configured to generate a target multi-path logical device for the target MPIO driver. The target MPIO driver groups a plurality of paths from the host device to a target logical volume of the storage system into the target multi-path logical device of the target MPIO driver. The host device is further configured to migrate data from the source logical volume to the target logical volume based at least in part on the source multi-path logical device of the target MPIO driver and the target multi-path logical device of the target MPIO driver.

These and other illustrative embodiments include, without limitation, apparatus, systems, methods and computer program products comprising processor-readable storage media.

BRIEF DESCRIPTION OF THE DRAWINGS

FIG. 3 is an example diagram illustrating the IO paths of the source multi-path logical device of FIG. 2 in an illustrative embodiment.

FIG. 4 is an example diagram illustrating the IO paths of the target multi-path logical device of FIG. 2 in an illustrative embodiment.

FIG. 5 is a flow diagram of an example process for path-based data migration from a source logical volume under control of a source multi-path logical device to a target logical volume under control of a target multi-path logical device in an illustrative embodiment.

FIG. 6 is an example diagram illustrating the IO paths of a source multi-path logical device of a target MPIO driver of FIG. 1 in an illustrative embodiment.

FIG. 7 is an example diagram illustrating the source multi-path logical device of FIG. 3 including the addition of a path to the source multi-path logical device of FIG. 6 in an illustrative embodiment.

FIG. 9 is an example diagram illustrating the IO paths of a target multi-path logical device of a target MPIO driver of FIG. 1 in an illustrative embodiment.

FIG. 10 is an example diagram illustrating the target multi-path logical device of FIG. 4 including the addition of a path to the target multi-path logical device of FIG. 9 in an illustrative embodiment.

FIG. 12 is an example diagram illustrating the source multi-path logical device of FIG. 7 with paths other than the added path to the source multi-path logical device of the target MPIO driver removed in an illustrative embodiment.

FIG. 13 is an example diagram illustrating the target multi-path logical device of FIG. 10 with paths other than the added path to the target multi-path logical device of the target MPIO driver removed in an illustrative embodiment.

FIG. 16 is an example diagram illustrating a data migration tool in an illustrative embodiment.

FIG. 17 is an example diagram illustrating the source multi-path logical device of FIG. 6 after data migration is complete and the paths to the source logical volume have been replaced by the paths to the target logical volume in an illustrative embodiment.

FIG. 18 is an example diagram illustrating the target multi-path logical device of FIG. 9 after data migration is complete and the paths to the target logical volume have been replaced by the paths to the source logical volume in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
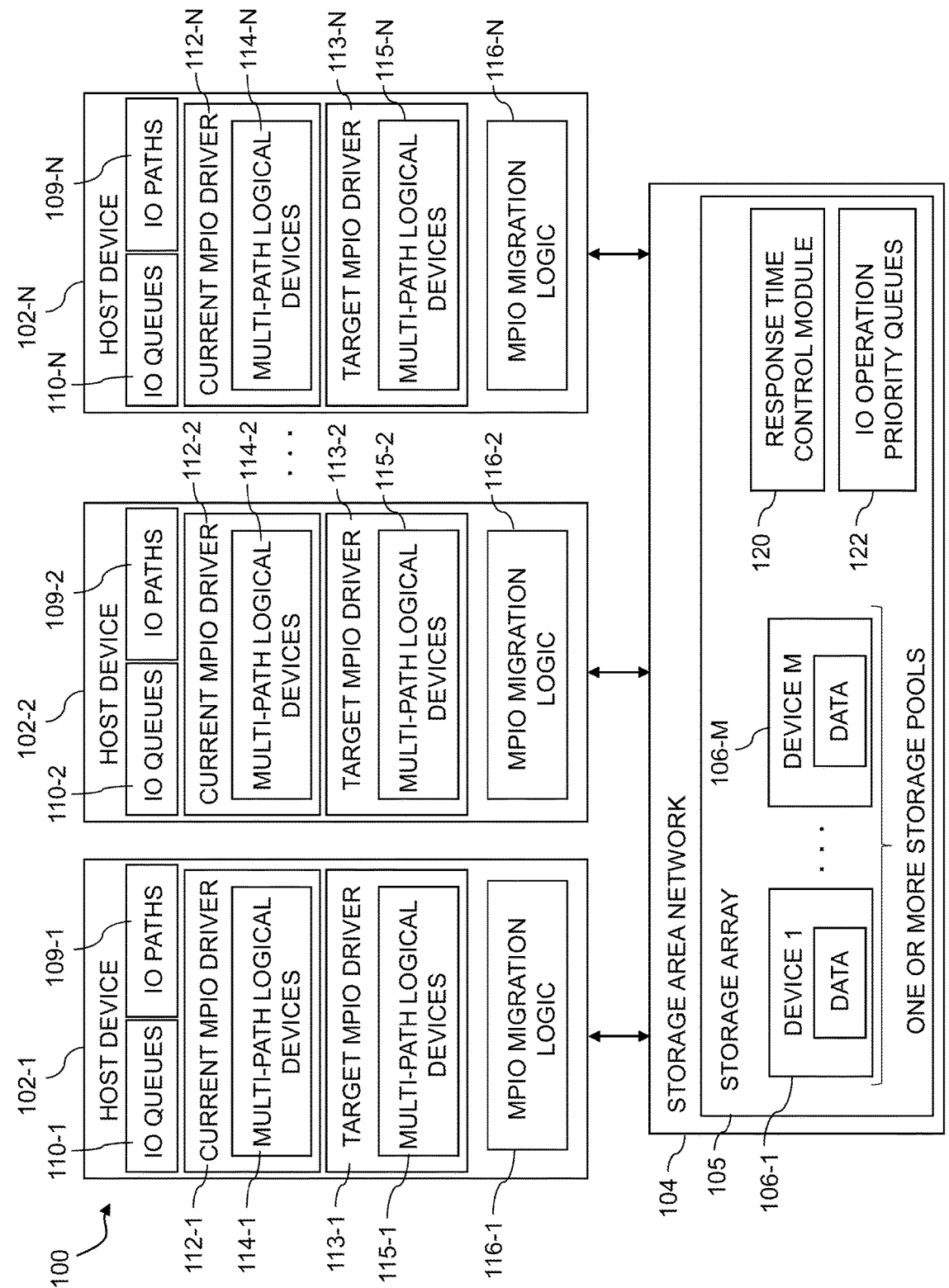
FIG. 1 is an example block diagram of an information processing system configured with functionality for path-based data migration from a source logical volume under control of a source multi-path logical device to a target logical volume under control of a target multi-path logical device in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical storage volumes such as, e.g., logical units (LUNs), that are configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise small computer system interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths 109 to the storage array 105, with at least one of the storage devices 106 of the storage array 105 being visible to that host device 102 on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO paths 109-1, 109-2, . . . 109-N, respective sets of IO queues 110-1, 110-2, . . . 110-N, respective current MPIO drivers 112-1, 112-2, . . . 112-N, and respective target MPIO drivers 113-1, 113-2, . . . 113-N, and respective MPIO migration logic 116-1, 116-2, . . . 116-N.

As used herein, IO paths 109-1 through 109-N, refer to information about or lists of the IO pathways between a given host device 102-1 through 102-N and one or more storage arrays 105. This information may include, for example, initiator-target pairs or other similar information that may define an IO pathway between the given host device 102 and the one or more storage arrays 105. This information may be used by an MPIO driver of the given host device to transmit data to or receive data from the one or more storage arrays 105 using the defined IO pathway.

While each host device 102 is illustrated as having a respective target MPIO driver 113 and MPIO migration logic 116, in some embodiments such target MPIO drivers 113 and MPIO migration logic 116 may be installed on one of host devices 102 or a subset of host devices 102. For example, target MPIO drivers 113 and MPIO migration logic 116 may be installed on host devices 102 for which a user wishes to perform a data migration.

MPIO drivers typically group all IO paths 109 from a host to a LUN or other logical storage volume into a single logical device known as a multi-path logical device. For example, current MPIO drivers 112-1, 112-2, . . . 112-N, may have respective multi-path logical devices 114-1, 114-2, . . . 114-N that each group at least a portion of the IO paths 109 together for the respective host device 102-1, 102-2, . . . 102-N and target MPIO drivers 113-1, 113-2, . . . 113-N, may have respective multi-path logical devices 115-1, 115-2, . . . 115-N that each group at least a portion of the IO paths 109 together for the respective host device 102-1, 102-2, . . . , 102-N. In some embodiments, each respective MPIO driver 112 or 113 may include multiple multi-path logical devices 114 or 115, respectively. The individual block devices representing each IO path 109 are known as native devices. Applications use a multi-path logical device for IO operations so that the IO operations may be distributed across all available IO paths 109. When IO paths fail, the MPIO driver will typically redirect the IO operations to other alive IO paths in the multi-path logical device.

The MPIO drivers described herein may comprise, for example, otherwise conventional MPIO drivers, such as PowerPath drivers from Dell EMC, suitably modified in the manner disclosed herein to implement functionality for path-based data migration from a source logical volume under control of a source multi-path logical device to a target logical volume under control of a target multi-path logical device. Other types of MPIO drivers from other driver vendors may be suitably modified to incorporate functionality for path-based data migration from a source logical volume under control of a source multi-path logical device to a target logical volume under control of a target multi-path logical device as disclosed herein.

In some embodiments, migration involves synchronizing the target logical volume to the source logical volume, i.e., achieving an operating state in which the target logical volume stores the same data as the source logical volume, and then a path flip operation is performed so that subsequent accesses of the data are directed to the target logical volume instead of the source logical volume. Once the path flip operation is successfully accomplished, the source logical volume can be taken out of service or put to some other use.

A number of data migration technologies are available to migrate data from a source logical volume to a target logical volume. One such data migration tool is Dell EMC PowerPath® Migration Enabler (PPME). PowerPath®, of which PPME is one component, is available on common operating systems such as Linux, Windows, AIX and VMware ESX. PPME uses multiple data transfer technologies for data migration including, for example, HostCopy, Open Replicator, Sym clone, SAN copy, or other similar technologies.

The multi-path layer comprising MPIO drivers supports multiple IO paths 109 between each of the host devices 102 and the storage array 105. These IO paths 109 are illustratively associated with respective initiator-target pairs, with each initiator comprising a host bus adaptor (HBA) or other initiating entity of a given host device, such as the host device 102-1, and each target comprising a port or other targeted entity corresponding to one or more of the storage devices 106 of the storage array 105. As noted above, the storage devices 106 illustratively comprise LUNs or other types of logical storage volumes.

IO paths 109 may be added or deleted between the host devices 102 and the storage array 105 in the system 100. For example, the addition of one or more new IO paths 109-1 from host device 102-1 to the storage array 105 or the deletion of one or more existing IO paths 109-1 from the host device 102-1 to the storage array 105 may result from respective addition or deletion of at least a portion of the storage devices 106 of the storage array 105.

Addition or deletion of IO paths can also occur as a result of zoning and masking changes or other types of storage system reconfigurations performed by a storage administrator or other user.

In some embodiments, IO paths are added or deleted in conjunction with the addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, IO path discovery scans may be performed by the MPIO drivers of the multi-path layer as needed in order to discover the addition of new IO paths or the deletion of existing IO paths.

A given IO path discovery scan can be performed utilizing known functionality of conventional MPIO drivers, such as PowerPath drivers.

The IO path discovery scan in some embodiments may be further configured to identify one or more new LUNs or other logical storage volumes associated with the one or more new IO paths identified in the path discovery scan. The IO path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new IO paths 109 identified in an IO path discovery scan of the type described above, the corresponding one of the host devices 102 is configured to execute a host registration operation for that IO path 109. The host registration operation for a given new IO path 109 illustratively provides notification to the storage array 105 that the corresponding one of the host devices 102 has discovered the new path.

The MPIO drivers utilize the multiple IO paths 109 described above to send IO operations from the host devices 102 to the storage array 105.

For example, an MPIO driver is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The current MPIO drivers 112 and target MPIO drivers 113 collectively comprise a multi-path layer of the host devices 102. The MPIO migration logic 116 provides functionality for path-based data migration from a source logical volume under control of a source multi-path logical device to a target logical volume under control of a target multi-path logical device. In some embodiments, for example, host devices 102 may provide the functionality for path-based data migration from a source logical volume under control of a source multi-path logical device to a target logical volume under control of a target multi-path logical device. In some embodiments, MPIO migration logic 116 may alternatively be included as part of a target MPIO driver 113.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support migration of the control of multi-path logical devices from a current MPIO driver to a target MPIO driver without requiring significant application downtime as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers from the storage array 105.

Numerous other distributed implementations of the host devices 102 and/or the storage array 105 are possible. Accordingly, the storage array 105 can also be implemented in a distributed manner across multiple data centers.

A user typically utilizes a MPIO driver for the IO load balancing or other multi-pathing needs associated with executing an application on a storage system. In some scenarios, a user may wish to upgrade or replace the storage devices on which the application data is stored. In such a scenario, the user may find it difficult to upgrade or replace the storage devices without significantly impacting the performance of their application and in some cases may even need to temporarily stop execution of the application and perform multiple system reconfigurations to migrate the data from a source logical volume to a target logical volume. In some embodiments, for example, a third-party data migration tool may be utilized to transfer the data from the source volume to a destination volume which may not be under control of the MPIO driver. The disclosed techniques migrate data from the source volume to the target volume in a manner that mitigates the need for application downtime to reconfigure the system and in some embodiments has no application downtime.

Host based migration solutions typically provide support for data migration among logical volumes which are under control of only one type of MPIO driver. If a user wishes to migrate data from a logical volume that is under the control of a particular MPIO driver to a logical volume that is under the control of another MPIO driver, application downtime and reconfiguration is typically required to perform the migration. Moreover, if the source logical volume belongs to vendor not supported by the third-party data migration tool then migration of data may not be possible.

Array based migration solutions typically use Network Addressing Authority (NAA) 6 identifier (ID) spoofing. In this approach the target logical volumes are programmed with the same NAA6 ID as the source logical volumes. Then these target logical volumes are mapped to the host device. The MPIO driver at the host device adds the target logical volume paths to the same source logical volume. Since non-volatile memory express (NVMe) devices are not governed by the Small Computer System Interface (SCSI) transport protocol, the array based NAA6 ID spoofing solution will have less relevance in NVME world.

Because of the above-mentioned limitations of host-based and array-based migration solutions, users are often left with no other choice than application downtime and reconfiguration while migrating data from a source logical volume to a target logical volume.

For example, since applications continuously use the multi-path logical devices for IO operations, and different MPIO drivers may not be compatible with the same data migration tools, it may become challenging to migrate data between logical volumes under control of different MPIO drivers. In some cases, even migrating data between logical volumes under control of the same MPIO driver may be difficult where, for example, that MPIO driver is not compatible with the data migration tool being used for the data migration. Because of this, a data migration may disrupt IO operations or cause substantial or significant application downtime in the applications using the host device 102. Since the multi-path logical device 114 is an entity created by the current MPIO driver 112, the data migration for logical volumes under control of the multi-path logical device 114 typically needs to be performed using compatible data migration tools. If the user wishes to utilize other third-party tools, or the target logical volume is under control of a multi-path logical device of another MPIO driver that is not compatible with the current MPIO driver 112, however, system reconfigurations or other similar measures may need to be take which may result in significant and substantial application downtime.

MPIO migration logic 116 is configured to migrate data between a source logical volume and a target logical volume regardless of the controlling multi-path logical devices and MPIO drivers for those logical volumes and their respective compatibility with particular data migration tools. This data migration is performed without incurring significant or substantial downtime, and in some embodiments without incurring any downtime, of an application running on the host device 102 that is performing the data migration. For example, MPIO migration logic 116 is configured to perform the data migration by transferring effective control of the multi-path logical devices controlling the source logical volume and target logical volume for the data migration from a current MPIO driver 112 (or other MPIO driver) to a target MPIO driver 113 through the use of pathing. By transferring effective control of the multi-path logical devices to the target MPIO driver 113, without replacing or uninstalling the current MPIO driver 112 (or other MPIO driver), the data migration may be performed by data migration tools associated with the target MPIO driver 113 and under control of the target MPIO driver 113 without incurring significant or substantial application downtime.

Under the MPIO migration logic 116, control of a multi-path logical device 114 that was created by the current MPIO driver 112 is transferred to the target MPIO driver 113 by adding a corresponding multi-path logical device 115 of the target MPIO driver 113 as a path in the multi-path logical device 114 and removing one or more of the other paths, and in some embodiments all of the other paths. This allows any IO operations that utilize the multi-path logical device 114 to traverse the added path to the multi-path logical device 115 of the target MPIO driver 113 before being acted on by the target MPIO driver 113 for data migration, load balancing, and routing to the storage array 105. This seamless transfer of control allows the target MPIO driver 113 to be used for the data migration while also preserving any IO operation flows of the applications running on the host device 102 for which the data migration is being performed.

Figure 2:
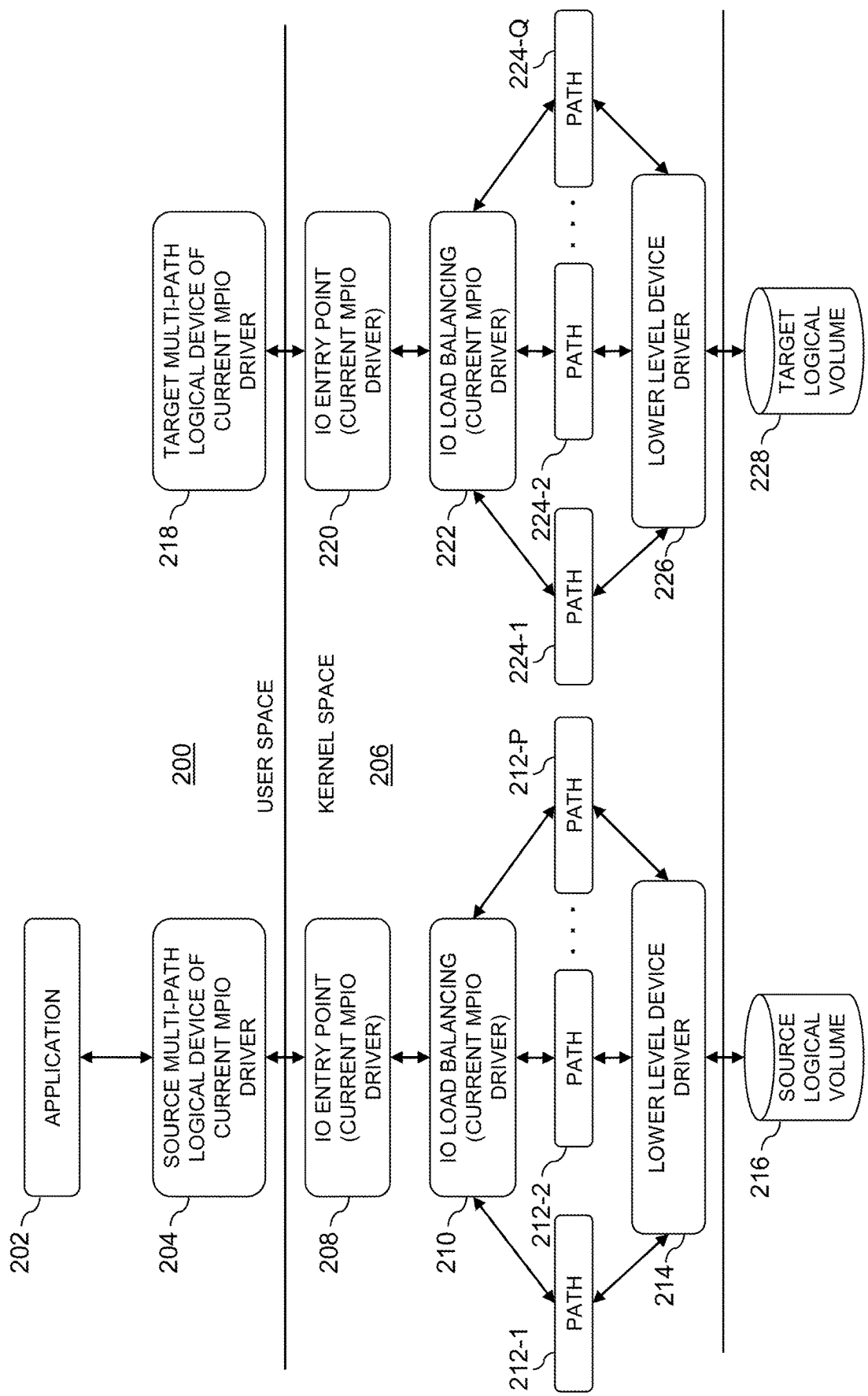
FIG. 2 is an example diagram illustrating the interaction paths between a host device and a storage array using a source and target multi-path logical devices controlled by a current MPIO driver in an illustrative embodiment.

With reference now to FIGS. 1 and 2, example interaction paths between the host device 102 and storage array 105 using multi-path logical devices 114 controlled by current MPIO driver 112 are illustrated.

For example, in a user space 200, an application 202 resident on a host device 102 submits IO operations for processing. Current MPIO driver 112 may select the IO operations for delivery via a multi-path logical device 114, e.g., source multi-path logical device 204 in FIG. 2, establishing communication between application 202 and the source multi-path logical device 204.

In a kernel space 206, an IO entry point 208 of the source multi-path logical device 204 that is controlled by the current MPIO driver 112 is configured to receive the selected IO operations and submit the selected IO operations to an IO load balancing component 210 of the current MPIO driver 112. The IO load balancing component 210 performs load balancing, for example, by assigning the IO operations to different paths 212-1, 212-2, . . . 212-P of the source multi-path logical device 204. The IO paths 212-1, 212-2 . . . 212-P may be generated for the source multi-path logical device 204 by the MPIO driver 112 as described above, for example, using IO path discovery scans. FIG. 3 illustrates an example of the source multi-path logical device 204 with active paths 212-1, 212-2, 212-3, . . . 212-P. As can be seen from example of FIG. 3, the paths 212 are active, ready, and running.

In some embodiments, the IO operations may be balanced across the paths 212, where, for example, path 212-1 receives one or more IO operations, path 212-2 receives one or more IO operations, path 212-3 receives one or more IO operations, . . . and path 212-P receives one or more IO operations. In some embodiments, a given path may receive none of the IO operations, all of the IO operations, or any portion of the IO operations. The number of IO operations assigned to each path may be determined, for example, based on the current load on each path, or in any other manner commonly used by MPIO drivers during load balancing.

A lower level device driver 214 is configured to receive the IO operations from the paths 212, and to transfer the IO operations to a source logical volume 216 of storage array 105.

In illustrative embodiments, a migration of data stored in the source logical volume 216 may be initiated, for example, by a user of the application, a user of the host device, a system administrator, or another entity. A target logical volume 228 may be designated as a target for the data migration, for example, by the user or in another manner.

In some embodiments, the current MPIO driver 112 may comprise a target multi-path logical device 218 that controls the paths between the host device 102 and the target logical volume 228, in a similar manner to source multi-path logical device 204. For example, in the user space 200 of the host device 102, current MPIO driver 112 is configured to establish communication between host device 102 and the target multi-path logical device 218. While described herein as a multi-path logical device of the current MPIO driver 112, in some embodiments, target multi-path logical device 218 may alternatively be a multi-path logical device of another MPIO driver 112 where, for example, the paths between the host device 102 and the source logical volume 216 and the paths between the host device 102 and the target logical volume 228 are under control of different MPIO drivers.

In the kernel space 206, an IO entry point 220 of the target multi-path logical device 218 that is controlled by the current MPIO driver 112 is configured to receive IO operations and submit the IO operations to an IO load balancing component 220 of the current MPIO driver 112. The IO load balancing component 220 performs load balancing, for example, by assigning the IO operations to different paths 224-1, 224-2, . . . 224-Q of the target multi-path logical device 218 in a similar manner to that described above for IO load balancing component 210. In some embodiments, the same IO entry point 208 and IO load balancing component 210 may alternatively be used for performing IO load balancing for both the source multi-path logical device 204 and the target multi-path logical device 218.

The IO paths 224-1, 224-2 . . . 224-Q may be generated for the target multi-path logical device 218 by the MPIO driver 112 as described above, for example, using IO path discovery scans. FIG. 4 illustrates an example of the target multi-path logical device 218 with paths 224-1, 224-2, 224-3, . . . 224-Q. As can be seen from example of FIG. 4, the paths 224 are active, undefined (undef), and running. For example, while theses paths are active and running, they are undefined because they are not currently in use for servicing IO operations since the data has not yet been migrated and the application 202 is not yet using the target logical volume 228.

In some embodiments, IO operations may be balanced across the paths 224, where, for example, path 224-1 receives one or more IO operations, path 224-2 receives one or more IO operations, path 224-3 receives one or more IO operations, . . . and path 224-Q receives one or more IO operations. In some embodiments, a given path may receive none of the IO operations, all of the IO operations, or any portion of the IO operations. The number of IO operations assigned to each path may be determined, for example, based on the current load on each path, or in any other manner commonly used by MPIO drivers during load balancing.

A lower level device driver 226 is configured to receive the IO operations from the paths 224, and to transfer the IO operations to the target logical volume 228 of storage array 105. In some embodiments, lower level device driver 214 may alternatively be used to transfer IO operations both from paths 212 to source logical volume 216 and from paths 224 to target logical volume 228.

Illustrative embodiments of the techniques and functionality of MPIO migration logic 116 will now be described in more detail with reference to FIGS. 5-19.

FIG. 5 illustrates a process implemented by MPIO migration logic 116 for migrating data from a source logical volume 216 to a target logical volume 228 with reference also to FIGS. 1-4 and 6-18.

The process as shown in FIG. 5 includes steps 500 through 512, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices, such as LUNs or other logical storage volumes.

At 500, the host device 102 installs the target MPIO driver 113. In some embodiments, target MPIO driver 113 may already be installed on host device 102. For example, target MPIO driver 113 may already be active on the host device 102 and may select IO operations from the IO queues 110 for delivery to the storage array 105, e.g., using its own multi-path logical devices 115.

At 502, MPIO migration logic 116 obtains a command to migrate data from the source logical volume 216 to the target logical volume 228. For example, the MPIO migration logic 116 may obtain or otherwise receive an indication from host device 102 or another source that indicates that the data is to be migrated from the source logical volume 216 to the target logical volume 228. In some embodiments, the command to migrate the data may be obtained prior to installation of the target MPIO driver 113. For example, in some embodiments the host device 102 may install the target MPIO driver 113 in response to obtaining the command to migrate the data.

In some embodiments, an IO control message (IOCTL) may be sent to the MPIO migration logic 116 from the host device 102 that indicates to the MPIO migration logic 116 that data is to be migrated from the source logical volume 216 to the target logical volume 228.

Figure 8:
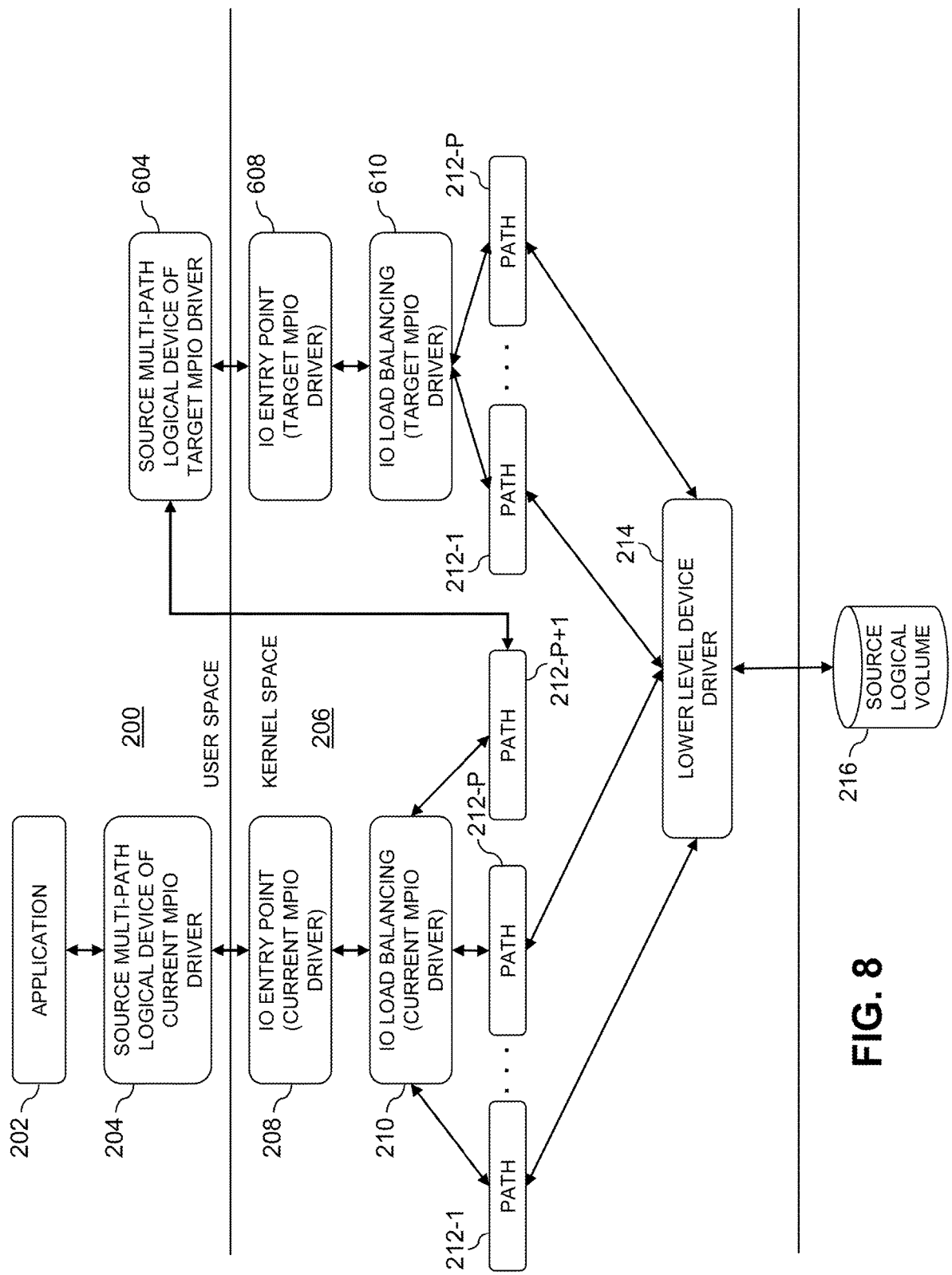
FIG. 8 is an example diagram illustrating the IO paths of the source multi-path logical device of FIG. 7 including the added path in an illustrative embodiment.

At 504, with reference also to FIGS. 6 and 8, MPIO migration logic 116 generates a source multi-path logical device 604 for the target MPIO driver 113 that corresponds to the source multi-path logical device 204 of the source MPIO driver 112. For example, the generated source multi-path logical device 604 comprises the same grouping of the plurality of paths as the source multi-path logical device 204. For example, as shown in FIG. 6, source multi-path logical device 604 comprises paths 212-1, 212-2, 212-3 . . . 212-P. In some embodiments, target MPIO driver 113 may have already generated the source multi-path logical device 604 for the source logical volume 216, for example, using the scanning techniques described above, and MPIO migration logic 116 may alternatively identify the source multi-path logical device 604 as corresponding to the source multi-path logical device 204 of the source MPIO driver 112. As shown in FIG. 8, for example, source multi-path logical device 604 interfaces with an IO entry point 608 and corresponding IO load IO balancing component 610 of the target MPIO driver 113 to perform IO load balancing across paths 212-1 . . . 212-P for delivery of IO operations to source logical volume 216 via lower level device driver 214.

Figure 11:
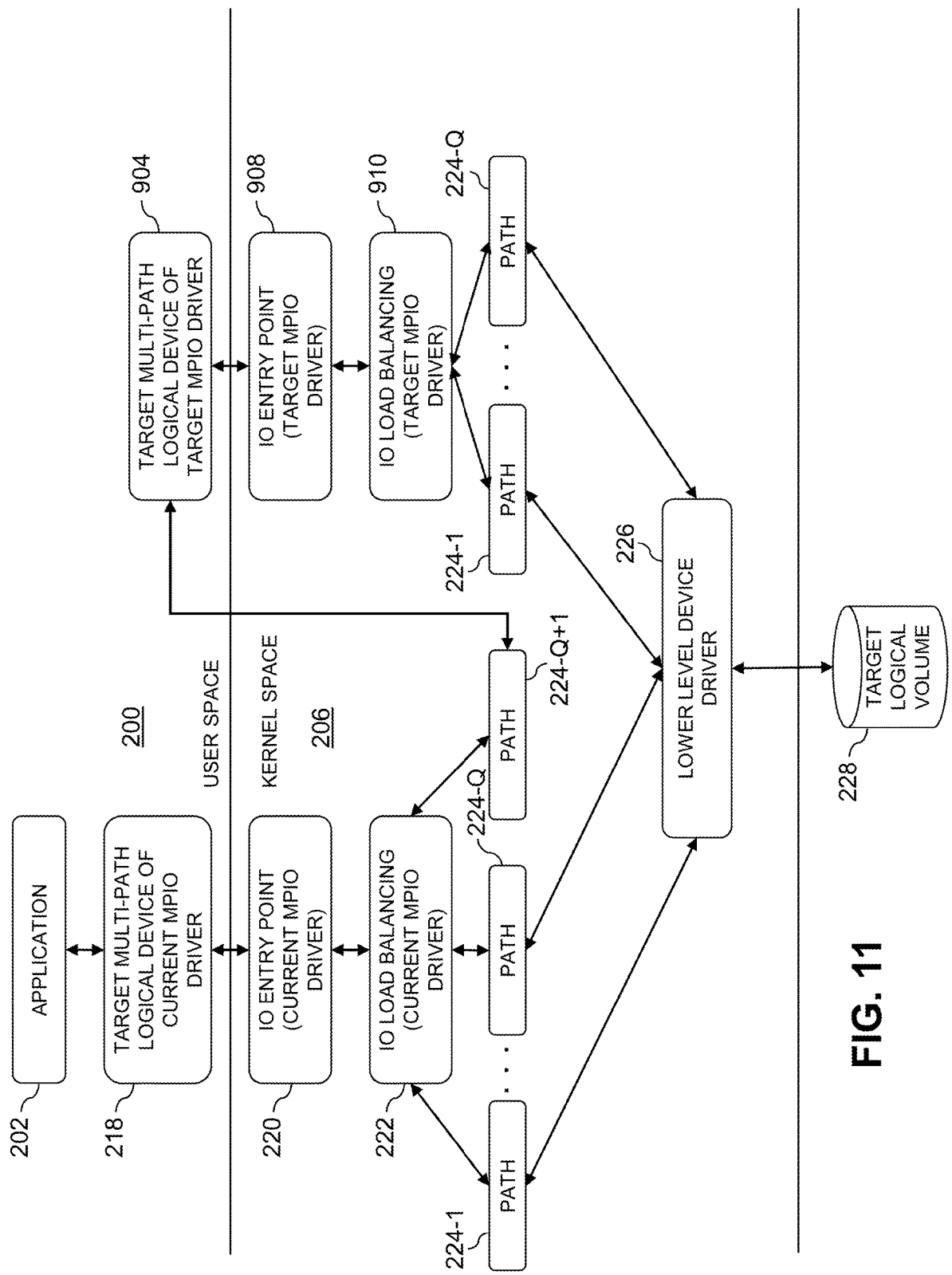
FIG. 11 is an example diagram illustrating the IO paths of the target multi-path logical device of FIG. 10 including the added path in an illustrative embodiment.

In some embodiments, with reference also to FIGS. 9 and 11, MPIO migration logic 116 may also generate a target multi-path logical device 904 for target MPIO driver 113 that corresponds to the target multi-path logical device 218 at step 504. For example, the generated target multi-path logical device 904 is generated to comprise the same grouping of the plurality of paths as the target multi-path logical device 218. For example, as shown in FIG. 9, target multi-path logical device 904 comprises paths 224-1, 224-2, 224-3 . . . 224-Q. In some embodiments, target MPIO driver 113 may have already generated the target multi-path logical device 904 for the target logical volume 228, for example, using the scanning techniques described above, and MPIO migration logic 116 may alternatively identify the target multi-path logical device 904 as corresponding to the target multi-path logical device 218 of the source MPIO driver 112. As shown in FIG. 11, for example, target multi-path logical device 904 interfaces with an IO entry point 908 and corresponding IO load balancing component 910 of the target MPIO driver 113 to perform IO load balancing across paths 224-1 . . . 224-Q for delivery of IO operations to target logical volume 228 via lower level device driver 226. In some embodiments, the same IO entry point 608 and IO load balancing component 610 may alternatively be used for performing IO load balancing for both the source multi-path logical device 604 and the target multi-path logical device 904.

At 506, MPIO migration logic 116 adds the source multi-path logical device 604 of the target MPIO driver 113 as a path 212-P+1 in the source multi-path logical device 204 of the current MPIO driver 112, for example, as shown in FIGS. 7 and 8.

In some embodiments, MPIO migration logic 116 also adds the target multi-path logical device 904 of the target MPIO driver 113 as a path 224-Q+1 in the target multi-path logical device 218 of the current MPIO driver 112, for example, as shown in FIGS. 10 and 11 at step 506.

Figure 14:
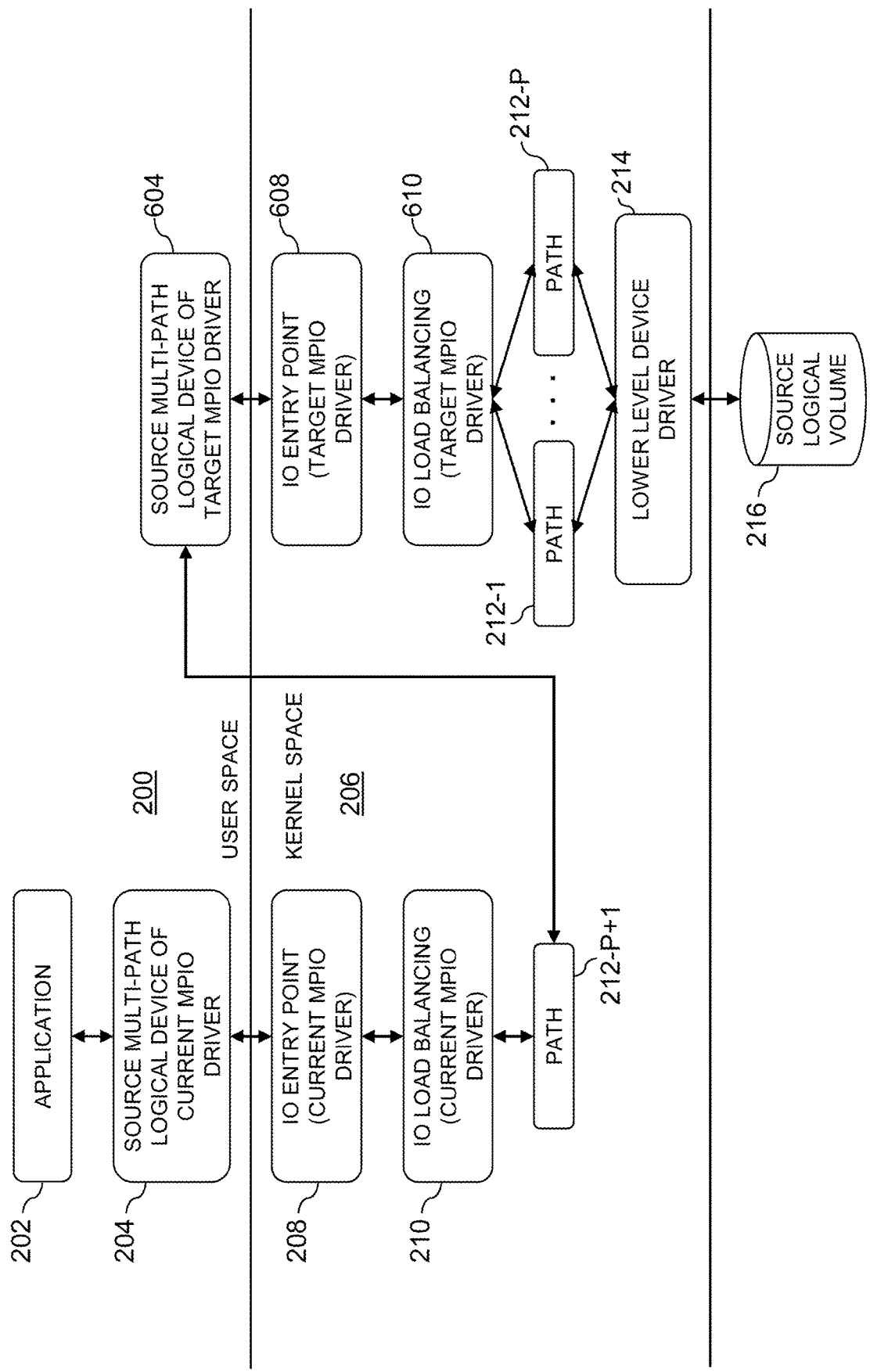
FIG. 14 is an example diagram illustrating the IO paths of the source multi-path logical device of FIG. 12 including only the added path in an illustrative embodiment.

At 508, MPIO migration logic 116 removes one or more paths of the source multi-path logical device 204 of the current MPIO driver 112 other than the added path 212-P+1. For example, as shown in FIGS. 12 and 14, paths 212-1, 212-2, 212-3 . . . 212-P have been removed from the source multi-path logical device 204, leaving path 212-P+1 as the only remaining path.

Figure 15:
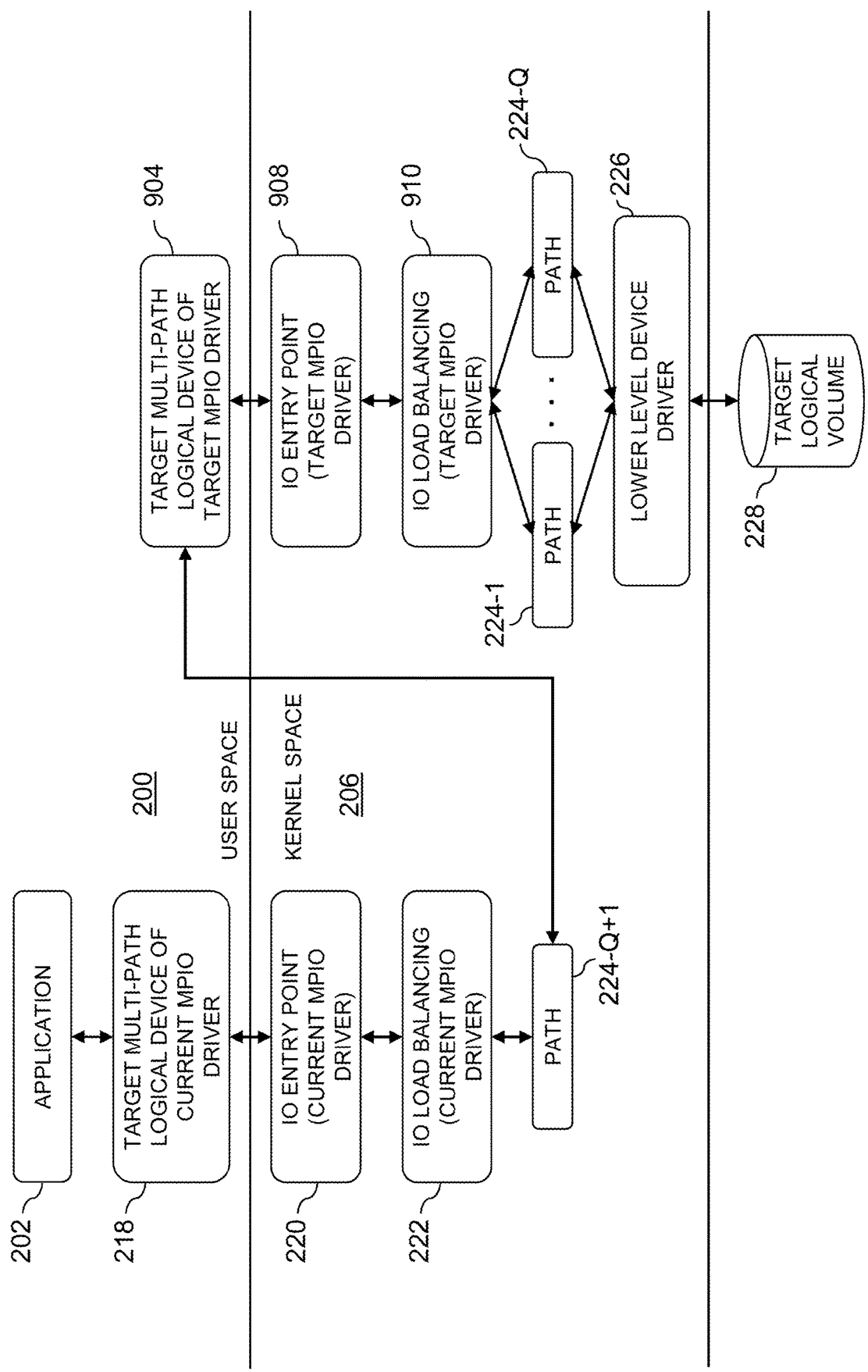
FIG. 15 is an example diagram illustrating the IO paths of the target multi-path logical device of FIG. 13 including only the added path in an illustrative embodiment.

In some embodiments, MPIO migration logic 116 also removes one or more paths of the target multi-path logical device 218 of the current MPIO driver 112 other than the added path 224-Q+1. For example, as shown in FIGS. 13 and 15, paths 224-1, 224-2, 224-3 . . . 224-Q have been removed from the target multi-path logical device 218, leaving path 224-Q+1 as the only remaining path.

In some embodiments, for example, in a scenario where the target logical volume 228 is already under control of the target multi-path logical device 904 of the target MPIO driver 113 and no target multi-path logical device 218 of the current MPIO driver 112 is present, there may be no need to add the target multi-path logical device 904 as a path to a multi-path logical device of the current MPIO driver 112 for the data migration. For example, in such a scenario, the data may be migrated from the source logical volume 216 to the target logical volume 228 using source multi-path logical device 204, source multi-path logical device 604 and target multi-path logical device 904, but not target multi-path logical device 218.

Example techniques that may be used to add a multi-path logical device as a path to another multi-path logical device and remove the other remaining paths are disclosed in U.S. patent application Ser. No. 16/261,856, filed Jan. 30, 2019 and entitled "Path-Based Migration of Control of a Multi-Path Logical Device from a Current MPIO Driver to a Target MPIO Driver," which is incorporated by reference herein in its entirety.

At 510, MPIO migration logic 116 migrates data from the source logical volume 216 to the target logical volume 228 based at least in part on the source multi-path logical device 604 of the target MPIO driver 113 and the target multi-path logical device 904 of the target MPIO driver 113. For example, as shown in FIG. 16, a data migration tool 1602 is used to migrate the data from the source logical volume 216 to the target logical volume 228 e.g., using the source multi-path logical device 604 (indicated in FIG. 16 as "source"), the target multi-path logical device 904 (indicated in FIG. 16 as "target") and a given data migration technique such as, e.g., HostCopy or another data migration technique, as described above.

At 512, after the data migration has completed, MPIO migration logic 116 replaces the paths 212-1, 212-2, 212-3 . . . 212-P of the source multi-path logical device 604 with the paths 224-1, 224-2, 224-3 . . . 224-Q of the target multi-path logical device 904, for example, as shown in FIG. 17. By replacing the paths of the source multi-path logical device 604 with the paths of the target multi-path logical device 904, the source multi-path logical device 604 may be used to access the target logical volume 228. For example, since the source multi-path logical device 604 is the only path of the source multi-path logical device 204 of the current MPIO driver 112 and now has the paths to the target logical volume 228, when the current MPIO driver 112 selects an IO operation from the IO queue that targets the source logical volume 116 for delivery using the source multi-path logical device 204, the IO operation is instead delivered to the target logical volume 228 via the source multi-path logical device 604. This allows the data migration to be performed without incurring signification downtime or restructuring of the application 202.

In some embodiments, MPIO migration logic 116 may also replace the paths 224-1, 224-2, 224-3 . . . 224-Q of the target multi-path logical device 904 with the paths 212-1, 212-2, 212-3 . . . 212-P of the source multi-path logical device 604, for example, as shown in FIG. 18.

In some embodiments, the replacement of paths 212-1, 212-2, 212-3 . . . 212-P of the source multi-path logical device 604 with the paths 224-1, 224-2, 224-3 . . . 224-Q of the target multi-path logical device 904 and the replacement of paths 224-1, 224-2, 224-3 . . . 224-Q of the target multi-path logical device 904 with the paths 212-1, 212-2, 212-3 . . . 212-P of the source multi-path logical device 604 may be referred to as a "path flip" or "path flip operation."

In some embodiments, the SCSI, NVMe or other communication protocol personalities for the source and target multi-path devices are also flipped.

In some embodiments, for example, where the user desires to continue using the only current MPIO driver 112, the paths 224-1, 224-2, 224-3 . . . 224-Q may be added to the source multi-path logical device 204 of the current MPIO driver 112 and the path 212-P+1 may be removed such that IO operations selected for IO load balancing by the source multi-path logical device 204 by the current MPIO driver 112 will be directed to the target logical volume 228 by the source multi-path logical device 204 via paths 224-1, 224-2, 224-3 . . . 224-Q without first being re-routed through the source multi-path logical device 604 of the target MPIO driver 113.

Separate instances of the FIG. 5 process may be performed in respective additional host devices that share the storage array.

The particular processing operations and other system functionality described in conjunction with the flow diagram of FIG. 5 are presented by way of illustrative example only, and should not be construed as limiting the scope of the disclosure in any way. Alternative embodiments can use other types of processing operations involving host devices, storage systems and MPIO migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO migration logic arrangements within a given information processing system.

Functionality such as that described in conjunction with the flow diagram of FIG. 5 can be implemented at least in part in the form of one or more software programs stored in memory and executed by a processor of a processing device, such as a computer or server. As will be described herein, a memory or other storage device having executable program code of one or more software programs embodied therein is an example of what is more generally referred to herein as a "processor-readable storage medium."

Numerous alternative arrangements of these and other features can be used in implementing the FIG. 5 process and other illustrative embodiments.

The illustrative embodiments disclosed herein can provide a number of significant advantages relative to conventional arrangements. For example, by replacing paths in the source multi-path logical device 204 with source multi-path logical device 604, data migration technologies associated with target MPIO driver 113 may be used for the data migration even where the current MPIO driver 112, which controls the source multi-path logical device associated with the source logical volume, may not be compatible with those technologies or may not be compatible with an MPIO driver controlling the target multi-path logical device associated with the target logical volume. In addition, the data migration does not incur significant application downtime or reconfiguration since the application may continue using the source multi-path logical device 204 of the current MPIO driver 112 both during and after the data migration as if no change has occurred in the underlying paths and storage location of its data.

In some embodiments, in conjunction with a reboot of the host device, MPIO drivers, a storage array or other portion of the system, additional processes may be performed due to the migration of the data from a source logical volume under control of the current MPIO driver 112 to a target logical volume under control of the target MPIO driver 113 as will now be described in more detail with reference to FIG. 19.

Figure 19:
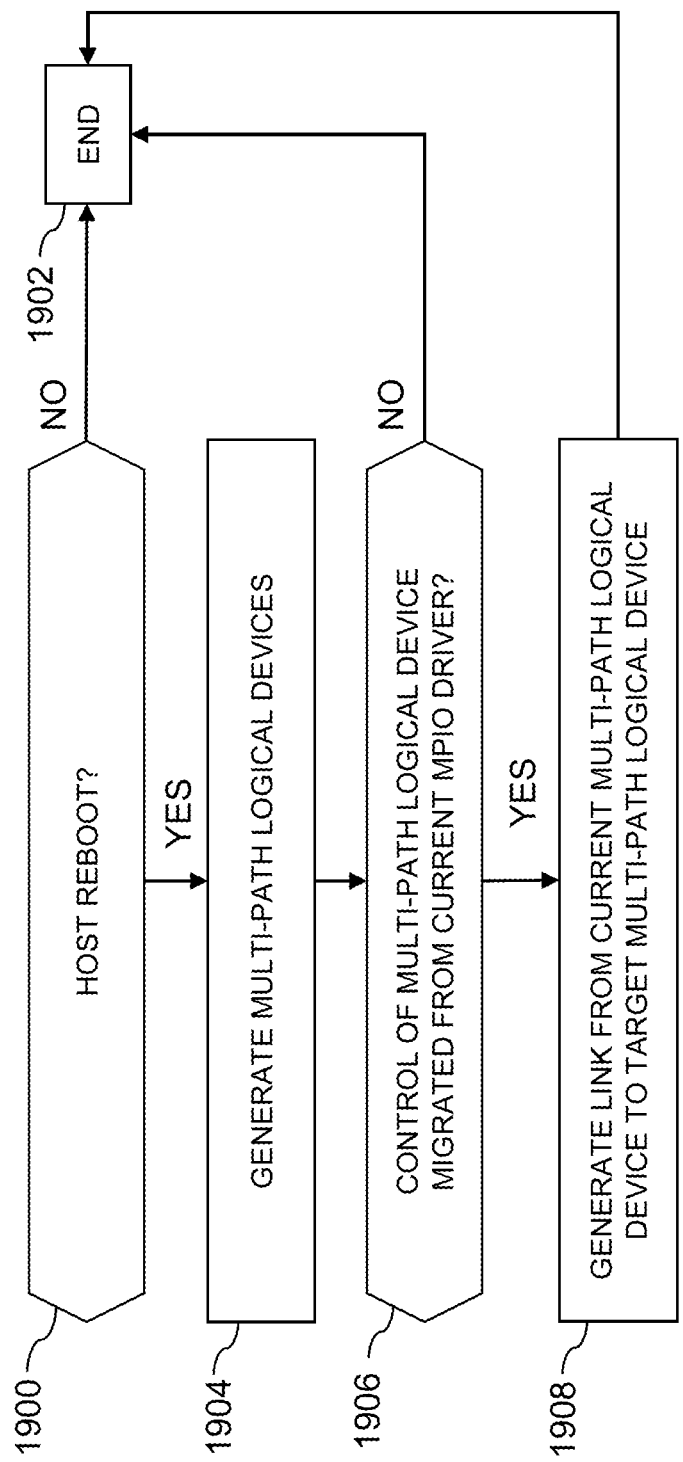
FIG. 19 is a flow diagram of an example process performed by a target MPIO driver in conjunction with a reboot after the data has been migrated in an illustrative embodiment.

The process as shown in FIG. 19 includes steps 1900 through 1908, and is suitable for use in the system 100 but is more generally applicable to other types of systems comprising multiple host devices and a shared storage system. The shared storage system in this embodiment is assumed to comprise at least one storage array having a plurality of storage devices. The storage devices can include logical storage devices, such as LUNs or other logical storage volumes.

At 1900, the target MPIO driver 113 determines whether or not the host device 102 or another component of the system has rebooted. If no reboot has occurred the process ends at 1902. In some embodiments, the host device 102 may indicate to the target MPIO driver 113 that a host reboot has occurred. In some embodiments, target MPIO driver 113 may determine that a host reboot has occurred upon initialization of the target MPIO driver 113 on the host device 102 in conjunction with the reboot process.

At 1904, the target MPIO driver 113 generates its multi-path logical devices 115, e.g., using IO path discovery scans as described above.

At 1906, while generating a given multi-path logical device 115, the target MPIO driver 113 checks if the given multi-path logical device 115 is associated with a multi-path logical device 114 that was previously migrated to control of the target MPIO driver 113 from the current MPIO driver 112, for example, as described above as part of the data migration by adding the given multi-path logical device 115 as the sole path for the multi-path logical device 114.

As an example, the target MPIO driver 113 may compare the unique ID of the multi-path logical device 115 being generated in conjunction with the system boot with the unique ID associated with multi-path logical device entries in a data structure that maintains a list of which multi-path logical devices have been migrated from control of the current MPIO driver 112 to the target MPIO driver 113, e.g., a transitioned device list. If the unique ID of the multi-path logical device 115 being generated matches the unique ID associated with one of the multi-path logical device entries in the data structure, the target MPIO driver 113 may determine that the given multi-path logical device 115 is associated with a multi-path logical device 114 that was migrated to control of the target MPIO driver 113.

If the target MPIO driver 113 determines that the given multi-path logical device 115 is not associated with a multi-path logical device 114 that was migrated, the target MPIO driver 113 continues generating the given multi-path logical device as normal and the process ends at 1902.

If the target MPIO driver 113 determines that the given multi-path logical device 115 is associated with a multi-path logical device 114 that was migrated, the target MPIO driver 113 continues generating the given multi-path logical device 115 as normal and also creates a link from the associated multi-path logical device 114 to the given multi-path logical device 115, e.g., at a directory, address, or other mechanism that was used by the current MPIO driver 112 to communicate with the multi-path logical device 114 at 1908. The link operates such that any call to the associated multi-path logical device 114 is instead automatically routed to the given multi-path logical device 115. For example, where each of the multi-path logical device 114 and given multi-path logical device 115 are files in a directory, an attempt to open the file of the multi-path logical device 114 will automatically open the file of the given multi-path logical device 115 due to the link. In this manner, the host device 102 does not require a reconfiguration to access the target logical volume using the new multi-path logical devices 115 created by target MPIO driver 113 in conjunction with a system boot. The process then continues to 1902 and ends. In some embodiments, the association between the multi-path logical device 114 and the given multi-path logical device 115 is removed from the transitioned device list.

Separate instances of the FIG. 19 process may be performed in respective additional host devices that share the storage array.

The particular processing operations and other system functionality described in conjunction with the flow diagram of FIG. 19 are presented by way of illustrative example only, and should not be construed as limiting the scope of the disclosure in any way. Alternative embodiments can use other types of processing operations involving host devices, storage systems and MPIO migration logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different MPIO migration logic arrangements within a given information processing system.

Functionality such as that described in conjunction with the flow diagram of FIG. 19 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for path-based data migration from a source logical volume under control of a source multi-path logical device to a target logical volume under control of a target multi-path logical device are carried out at least in part under the control of its MPIO migration logic 116. For example, MPIO migration logic 116 is illustratively configured to control performance of portions of the process shown in the flow diagrams described above in conjunction with FIGS. 5 and 19, and the diagrams of FIGS. 1-4 and 6-18.

It is assumed that each of the other MPIO drivers 112 and 113 are configured in a manner similar to that described above and elsewhere herein for the first current MPIO driver 112-1 and first target MPIO driver 113-1. The other host devices 102 of the system 100 are therefore also configured to communicate over the SAN 104 with the storage array 105 and the MPIO drivers 112 and 113 of such other host devices are each similarly configured to select JO operations from its corresponding one of the sets of JO queues 110 for delivery to the storage array 105 over the SAN 104, and to perform the disclosed functionality for path-based data migration from a source logical volume under control of a source multi-path logical device to a target logical volume under control of a target multi-path logical device. Accordingly, functionality described above in the context of the first MPIO drivers 112-1 and 113-1 is assumed to be similarly performed by each of the other MPIO drivers 112-2 and 113-2 through 112-N and 113-N for path-based data migration from a source logical volume under control of a source multi-path logical device to a target logical volume under control of a target multi-path logical device.

The MPIO drivers 112 and 113 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support path-based data migration from a source logical volume under control of a source multi-path logical device to a target logical volume under control of a target multi-path logical device.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for path-based data migration from a source logical volume under control of a source multi-path logical device to a target logical volume under control of a target multi-path logical device as disclosed herein, many storage systems will require substantial or significant application downtime to update, upgrade, or otherwise change their MPIO drivers to facilitate the data migration. This leads to inefficiencies in the storage system as well as in the host devices that share that storage system.

Such drawbacks are advantageously overcome in illustrative embodiments herein by utilization of MPIO migration logic 116 to implement functionality for path-based data migration from a source logical volume under control of a source multi-path logical device to a target logical volume under control of a target multi-path logical device as described above. For example, by replacing the paths of a source multi-path logical device of the current MPIO driver with a path to the source multi-path logical device of a target MPIO driver, the target MPIO driver and its associated functionality may be utilized for the migration of data from a source logical volume to a target logical volume without incurring significant application downtime or reconfiguration that would otherwise be require to perform the data migration using the current MPIO driver.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and MPIO migration logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the MPIO migration logic 116 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, MPIO migration logic and additional or alternative components. Also, the particular configurations of system and device elements and associated processing operations illustratively shown in the drawings can be varied in other embodiments. For example, a wide variety of different MPIO driver configurations and associated MPIO migration arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system;
the host device comprising a current multi-path input-output driver configured to control delivery of input-output operations to the storage system over the network, the current multi-path input-output driver grouping a plurality of paths from the host device to a source logical volume of the storage system into a source multi-path logical device of the current multi-path input-output driver;
wherein the host device is further configured:
to generate a source multi-path logical device for a target multi-path input-output driver, the source multi-path logical device of the target multi-path input-output driver comprising a same grouping of the plurality of paths from the host device to the source logical volume as the source multi-path logical device of the current multi-path input-output driver;
to add the source multi-path logical device of the target multi-path input-output driver as a path in the source multi-path logical device of the current multi-path input-output driver;
to remove one or more paths of the source multi-path logical device of the current multi-path input-output driver other than the added path;
to generate a target multi-path logical device for the target multi-path input-output driver, the target multi-path input-output driver grouping a plurality of paths from the host device to a target logical volume of the storage system into the target multi-path logical device of the target multi-path input-output driver; and
to migrate data from the source logical volume to the target logical volume based at least in part on the source multi-path logical device of the target multi-path input-output driver and the target multi-path logical device of the target multi-path input-output driver.

2. The apparatus of claim 1 wherein the host device is further configured:
to replace the paths of the source multi-path logical device of the target multi-path input-output driver with the paths of the target multi-path logical device of the target multi-path input-output driver.

3. The apparatus of claim 1 wherein the host device is further configured:
to replace the paths of the target multi-path logical device of the target multi-path input-output driver with the paths of the source multi-path logical device of the target multi-path input-output driver.

4. The apparatus of claim 1 wherein adding the source multi-path logical device of the target multi-path input-output driver as a path in the source multi-path logical device of the current multi-path input-output driver comprises:
suspending the source multi-path logical device of the current multi-path input-output driver;
modifying a path mapping of the source multi-path logical device of the current multi-path input-output driver to include the source multi-path logical device of the target multi-path input-output driver as a path;
resuming the source multi-path logical device of the current multi-path input-output driver; and
reloading the path mapping of the source multi-path logical device of the current multi-path input-output driver based at least in part on the modified path mapping.

5. The apparatus of claim 1 wherein removing one or more paths of the source multi-path logical device of the current multi-path input-output driver other than the added path comprises:
suspending the source multi-path logical device of the current multi-path input-output driver;
modifying a path mapping of the source multi-path logical device of the current multi-path input-output driver to remove one or more paths other than the added path;
resuming the source multi-path logical device of the current multi-path input-output driver; and reloading the path mapping of the source multi-path logical device of the current multi-path input-output driver based at least in part on the modified path mapping.

6. The apparatus of claim 1 wherein in conjunction with a reboot after the migration of the data, the host device is further configured:
to generate a plurality of multi-path logical devices for the target multi-path input-output driver;
to determine whether or not a given one of the generated multi-path logical devices corresponds to the source multi-path logical device of the target multi-path input-output driver; and
in response to determining that the given one of the generated multi-path logical devices correspond to the source multi-path logical device of the target multi-path input-output driver, to generate a link from the source multi-path logical device of the current multi-path input-output driver to the given one of the generated multi-path logical devices such that input-output operations directed toward the source multi-path logical device of the current multi-path input-output driver are redirected to the given one of the generated multi-path logical devices.

7. The apparatus of claim 1 wherein the current multi-path input-output driver groups the plurality of paths from the host device to the target logical volume of the storage system into a target multi-path logical device of the current multi-path input-output driver and wherein the host device is further configured:
to add the target multi-path logical device of the target multi-path input-output driver as a path in the target multi-path logical device of the current multi-path input-output driver; and
to remove one or more paths of the target multi-path logical device of the current multi-path input-output driver other than the path added to the target multi-path logical device of the current multi-path input-output driver.

8. A method comprising:
generating a source multi-path logical device for a target multi-path input-output driver of a host device, the host device comprising a current multi-path input-output driver that is configured to control delivery of input-output operations to a storage system over a network, the current multi-path input-output driver grouping a plurality of paths from the host device to a source logical volume of the storage system into a source multi-path logical device of the current multi-path input-output driver, the source multi-path logical device of the target multi-path input-output driver comprising a same grouping of the plurality of paths from the host device to the source logical volume as the source multi-path logical device of the current multi-path input-output driver;
adding the source multi-path logical device of the target multi-path input-output driver as a path in the source multi-path logical device of the current multi-path input-output driver;
removing one or more paths of the source multi-path logical device of the current multi-path input-output driver other than the added path;
generating a target multi-path logical device for the target multi-path input-output driver, the target multi-path input-output driver grouping a plurality of paths from the host device to a target logical volume of the storage system into the target multi-path logical device of the target multi-path input-output driver; and
migrating data from the source logical volume to the target logical volume based at least in part on the source multi-path logical device of the target multi-path input-output driver and the target multi-path logical device of the target multi-path input-output driver.

9. The method of claim 8 wherein the method further comprises replacing the paths of the source multi-path logical device of the target multi-path input-output driver with the paths of the target multi-path logical device of the target multi-path input-output driver.

10. The method of claim 8 wherein the method further comprises replacing the paths of the target multi-path logical device of the target multi-path input-output driver with the paths of the source multi-path logical device of the target multi-path input-output driver.

11. The method of claim 8 wherein adding the source multi-path logical device of the target multi-path input-output driver as a path in the source multi-path logical device of the current multi-path input-output driver comprises:
suspending the source multi-path logical device of the current multi-path input-output driver;
modifying a path mapping of the source multi-path logical device of the current multi-path input-output driver to include the source multi-path logical device of the target multi-path input-output driver as a path;
resuming the source multi-path logical device of the current multi-path input-output driver; and
reloading the path mapping of the source multi-path logical device of the current multi-path input-output driver based at least in part on the modified path mapping.

12. The method of claim 8 wherein removing one or more paths of the source multi-path logical device of the current multi-path input-output driver other than the added path comprises:
suspending the source multi-path logical device of the current multi-path input-output driver;
modifying a path mapping of the source multi-path logical device of the current multi-path input-output driver to remove one or more paths other than the added path;
resuming the source multi-path logical device of the current multi-path input-output driver; and
reloading the path mapping of the source multi-path logical device of the current multi-path input-output driver based at least in part on the modified path mapping.

13. The method of claim 8 wherein in conjunction with a reboot after the migration of the data, the method further comprises:
generating a plurality of multi-path logical devices for the target multi-path input-output driver;
determining whether or not a given one of the generated multi-path logical devices corresponds to the source multi-path logical device of the target multi-path input-output driver; and
in response to determining that the given one of the generated multi-path logical devices correspond to the source multi-path logical device of the target multi-path input-output driver, generating a link from the source multi-path logical device of the current multi-path input-output driver to the given one of the generated multi-path logical devices such that input-output operations directed toward the source multi-path logical device of the current multi-path input-output driver are redirected to the given one of the generated multi-path logical devices.

14. The method of claim 8 wherein the current multi-path input-output driver groups the plurality of paths from the host device to the target logical volume of the storage system into a target multi-path logical device of the current multi-path input-output driver and wherein the method further comprises:
adding the target multi-path logical device of the target multi-path input-output driver as a path in the target multi-path logical device of the current multi-path input-output driver; and
removing one or more paths of the target multi-path logical device of the current multi-path input-output driver other than the path added to the target multi-path logical device of the current multi-path input-output driver.

15. A computer program product comprising a non-transitory processor-readable storage medium having stored therein program code of one or more software programs, wherein the program code, when executed by a host device comprising a current multi-path input-output driver, the host device being configured to communicate over a network with a storage system, the current multi-path input-output driver configured to control delivery of input-output operations to the storage system over the network, the current multi-path input-output driver grouping a plurality of paths from the host device to a source logical volume of the storage system into a source multi-path logical device of the current multi-path input-output driver, causes the host device:
to generate a source multi-path logical device for a target multi-path input-output driver, the source multi-path logical device of the target multi-path input-output driver comprising a same grouping of the plurality of paths from the host device to the source logical volume as the source multi-path logical device of the current multi-path input-output driver;
to add the source multi-path logical device of the target multi-path input-output driver as a path in the source multi-path logical device of the current multi-path input-output driver;
to remove one or more paths of the source multi-path logical device of the current multi-path input-output driver other than the added path;
to generate a target multi-path logical device for the target multi-path input-output driver, the target multi-path input-output driver grouping a plurality of paths from the host device to a target logical volume of the storage system into the target multi-path logical device of the target multi-path input-output driver; and
to migrate data from the source logical volume to the target logical volume based at least in part on the source multi-path logical device of the target multi-path input-output driver and the target multi-path logical device of the target multi-path input-output driver.

16. The computer program product of claim 15 wherein the program code further causes the host device to replace the paths of the source multi-path logical device of the target multi-path input-output driver with the paths of the target multi-path logical device of the target multi-path input-output driver.

17. The computer program product of claim 15 wherein the program code further causes the host device to replace the paths of the target multi-path logical device of the target multi-path input-output driver with the paths of the source multi-path logical device of the target multi-path input-output driver.

18. The computer program product of claim 15 wherein adding the source multi-path logical device of the target multi-path input-output driver as a path in the source multi-path logical device of the current multi-path input-output driver comprises:
suspending the source multi-path logical device of the current multi-path input-output driver;
modifying a path mapping of the source multi-path logical device of the current multi-path input-output driver to include the source multi-path logical device of the target multi-path input-output driver as a path;
resuming the source multi-path logical device of the current multi-path input-output driver; and
reloading the path mapping of the source multi-path logical device of the current multi-path input-output driver based at least in part on the modified path mapping.

19. The computer program product of claim 15 wherein removing one or more paths of the source multi-path logical device of the current multi-path input-output driver other than the added path comprises:
suspending the source multi-path logical device of the current multi-path input-output driver;
modifying a path mapping of the source multi-path logical device of the current multi-path input-output driver to remove one or more paths other than the added path;
resuming the source multi-path logical device of the current multi-path input-output driver; and
reloading the path mapping of the source multi-path logical device of the current multi-path input-output driver based at least in part on the modified path mapping.

20. The computer program product of claim 15 wherein the current multi-path input-output driver groups the plurality of paths from the host device to the target logical volume of the storage system into a target multi-path logical device of the current multi-path input-output driver and wherein the program code further causes the host device:
to add the target multi-path logical device of the target multi-path input-output driver as a path in the target multi-path logical device of the current multi-path input-output driver; and
to remove one or more paths of the target multi-path logical device of the current multi-path input-output driver other than the path added to the target multi-path logical device of the current multi-path input-output driver.

\* \* \* \* \*